US011682529B2

(12) United States Patent
Lee et al.

(10) Patent No.: US 11,682,529 B2
(45) Date of Patent: Jun. 20, 2023

(54) MULTILAYER CERAMIC CAPACITOR

(71) Applicant: SAMSUNG ELECTRO-MECHANICS CO., LTD., Suwon-si (KR)

(72) Inventors: Taek Jung Lee, Suwon-si (KR); Min Gon Lee, Suwon-si (KR); Jea Yeol Choi, Suwon-si (KR); Jin Man Jung, Suwon-si (KR); Jin Kyung Joo, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 0 days.

(21) Appl. No.: 17/546,385

(22) Filed: Dec. 9, 2021

(65) Prior Publication Data
US 2022/0102080 A1    Mar. 31, 2022

Related U.S. Application Data

(63) Continuation of application No. 16/855,272, filed on Apr. 22, 2020, now Pat. No. 11,309,131.

(30) Foreign Application Priority Data

Jul. 5, 2019    (KR) .................. 10-2019-0081079

(51) Int. Cl.
H01G 4/30        (2006.01)
H01G 4/12        (2006.01)
(Continued)

(52) U.S. Cl.
CPC .............. *H01G 4/30* (2013.01); *H01G 2/02* (2013.01); *H01G 4/008* (2013.01); *H01G 4/012* (2013.01); *H01G 4/1218* (2013.01)

(58) Field of Classification Search
CPC ...... H01G 4/242; H01G 4/0085; H01G 4/012; H01G 4/2325; H01G 4/30; H01G 4/008;
(Continued)

(56) References Cited

U.S. PATENT DOCUMENTS 9,236,186 B2      1/2016 Ahn et al.
11,309,131 B2*    4/2022 Lee ..................... H01G 4/012
(Continued)

FOREIGN PATENT DOCUMENTS

CN    103700499 A    4/2014
CN    103730254 A    4/2014
(Continued)

OTHER PUBLICATIONS

Final Office Action issued in corresponding U.S. Appl. No. 16/855,272 dated Oct. 18, 2021.
(Continued)

Primary Examiner — Michael P Mcfadden
(74) Attorney, Agent, or Firm — Morgan, Lewis & Bockius LLP

(57) ABSTRACT

A multilayer ceramic capacitor includes a body including a dielectric layer and first and second internal electrodes disposed with the dielectric layer interposed therebetween and disposed in point-symmetry with each other; first and second connection electrodes penetrating the body in a direction perpendicular to the dielectric layer and connected to the first internal electrode; third and fourth connection electrodes penetrating the body in a direction perpendicular to the dielectric layer and connected to the second internal electrode; first and second external electrodes disposed on both surfaces of the body and connected to the first and second connection electrodes; and third and fourth external electrodes spaced apart from the first and second external electrodes and connected to the third and fourth connection
(Continued)

electrodes, and the first and second internal electrodes include a region in which an electrode is not disposed.

14 Claims, 4 Drawing Sheets

(51) Int. Cl.
*H01G 2/02* (2006.01)
*H01G 4/008* (2006.01)
*H01G 4/012* (2006.01)

(58) Field of Classification Search
CPC .......... H01G 2/02; H01G 4/1218; H01G 4/12; H01L 23/642; H01L 25/18; H05K 1/181; H05K 2201/10015; H05K 2201/10515
See application file for complete search history.

(56) References Cited

U.S. PATENT DOCUMENTS

| | | | |
|---|---|---|---|
| 2002/0158307 A1* | 10/2002 | Honda | H01G 4/232 |
| | | | 257/532 |
| 2006/0152886 A1 | 7/2006 | Togashi et al. | |
| 2006/0291138 A1 | 12/2006 | Kang et al. | |
| 2011/0024175 A1* | 2/2011 | Satou | H01G 4/232 |
| | | | 174/260 |
| 2013/0088810 A1 | 4/2013 | Yang et al. | |
| 2014/0083755 A1 | 3/2014 | Lee et al. | |
| 2014/0104750 A1* | 4/2014 | Ahn | H01G 4/30 |
| | | | 361/306.3 |
| 2014/0160617 A1 | 6/2014 | Kim et al. | |
| 2014/0182911 A1 | 7/2014 | Lee et al. | |
| 2015/0090485 A1 | 4/2015 | Lee et al. | |
| 2015/0124371 A1* | 5/2015 | Park | H05K 1/162 |
| | | | 361/301.4 |
| 2016/0093438 A1* | 3/2016 | Sasabayashi | H01G 4/12 |
| | | | 361/301.4 |
| 2017/0194097 A1* | 7/2017 | Oh | H01G 4/30 |
| 2017/0194419 A1* | 7/2017 | Lee | H01G 4/008 |
| 2018/0019064 A1* | 1/2018 | Han | H01G 4/008 |
| 2018/0027656 A1 | 1/2018 | Jung et al. | |
| 2018/0068796 A1* | 3/2018 | Seo | H05K 1/111 |
| 2018/0082787 A1* | 3/2018 | Hamamori | H01G 4/2325 |
| 2021/0005387 A1 | 1/2021 | Kwon et al. | |

FOREIGN PATENT DOCUMENTS

| | | |
|---|---|---|
| CN | 104517730 A | 4/2015 |
| CN | 104979096 A | 10/2015 |
| CN | 107644735 A | 1/2018 |
| CN | 112185701 A | 1/2021 |
| CN | 112185704 A | 1/2021 |
| JP | 2006-196685 A | 7/2006 |
| JP | 2010-123613 A | 6/2010 |
| KR | 10-2006-0134277 A | 12/2006 |
| KR | 10-1376921 B1 | 3/2014 |

OTHER PUBLICATIONS

Office Action issued in corresponding U.S. Appl. No. 16/855,272 dated Aug. 17, 2021.
Office Action issued in corresponding Chinese Patent Application No. 202010641390.6 dated Jun. 24, 2022.

* cited by examiner

MULTILAYER CERAMIC CAPACITOR

CROSS-REFERENCE TO RELATED APPLICATION(S)

This application is the continuation application of U.S. patent application Ser. No. 16/855,272 filed on Apr. 22, 2020, now U.S. Pat. No. 11,309,131 issued on Apr. 19, 2022, which claims the benefit of priority to Korean Patent Application No. 10-2019-0081079 filed on Jul. 5, 2019 in the Korean Intellectual Property Office, the disclosures of which are incorporated herein by reference in their entirety.

TECHNICAL FIELD

The present disclosure relates to a multilayer ceramic capacitor.

BACKGROUND

Electronic devices including a multilayer ceramic capacitor (MLCC) have been increasingly used recently. A greater number of capacitors have been used in smartphones in the 5th generation era, and such capacitors are required to have high capacity. A mounting area of a passive component such as an MLCC and an inductor, however, has decreased as a size of a set product has been reduced, and accordingly, there have been increasing demand for reducing a size of a passive component. In accordance with the demand, an MLCC and an inductor may be packaged with an IC and an AP, may be embedded in a substrate, or may be mounted on a lower end of an AP as in a form of LSC to improve mounting flexibility.

Accordingly, a mounting area may decrease, and ESL occurring in a substrate may also decrease. Thus, there has been increasing demand for an MLCC product having a reduced size.

A dual via type capacitor may include a through-hole differently to that of a general MLCC. In the dual via type capacitor, cover layers may be disposed in upper and lower portions, a through-hole may be formed in a body in which an active layer forming capacitance is disposed, the through-holes may be filled with via electrodes, and the via electrodes may be electrically connected.

In such a via type capacitor, however, due to a via, ESL and ESR of the capacitor may be deteriorated, and capacitance may decrease.

SUMMARY

An aspect of the present disclosure is to provide a multilayer ceramic capacitor having improved equivalent series inductance (ESL) by offsetting of mutual inductance.

Another aspect of the present disclosure is to provide a multilayer ceramic capacitor having increased capacitance as compared to a multilayer ceramic capacitor having an internal via structure.

Another aspect of the present disclosure is to provide a multilayer ceramic capacitor having improved insulating breakdown voltage (BDV).

According to an aspect of the present disclosure, a multilayer ceramic capacitor is provided, the multilayer ceramic capacitor including a body including a dielectric layer and first and second internal electrodes disposed with the dielectric layer interposed therebetween and disposed in point-symmetry with each other; first and second connection electrodes penetrating the body in a direction perpendicular to the dielectric layer and connected to the first internal electrode; third and fourth connection electrodes penetrating the body in a direction perpendicular to the dielectric layer and connected to the second internal electrode; first and second external electrodes disposed on both surfaces of the body and connected to the first and second connection electrodes; and third and fourth external electrodes spaced apart from the first and second external electrodes and connected to the third and fourth connection electrodes, and the first and second internal electrodes include a region in which an electrode is not disposed.

BRIEF DESCRIPTION OF DRAWINGS

The above and other aspects, features, and advantages of the present disclosure will be more clearly understood from the following detailed description, taken in conjunction with the accompanying drawings, in which:

FIG. 3A is a cross-sectional diagram illustrating a first internal electrode, and FIG. 3B is a cross-sectional diagram illustrating a second internal electrode; FIG. 4A is a cross-sectional diagram illustrating a first internal electrode, and FIG. 4B is a cross-sectional diagram illustrating a second internal electrode.

DETAILED DESCRIPTION

Figure 1:
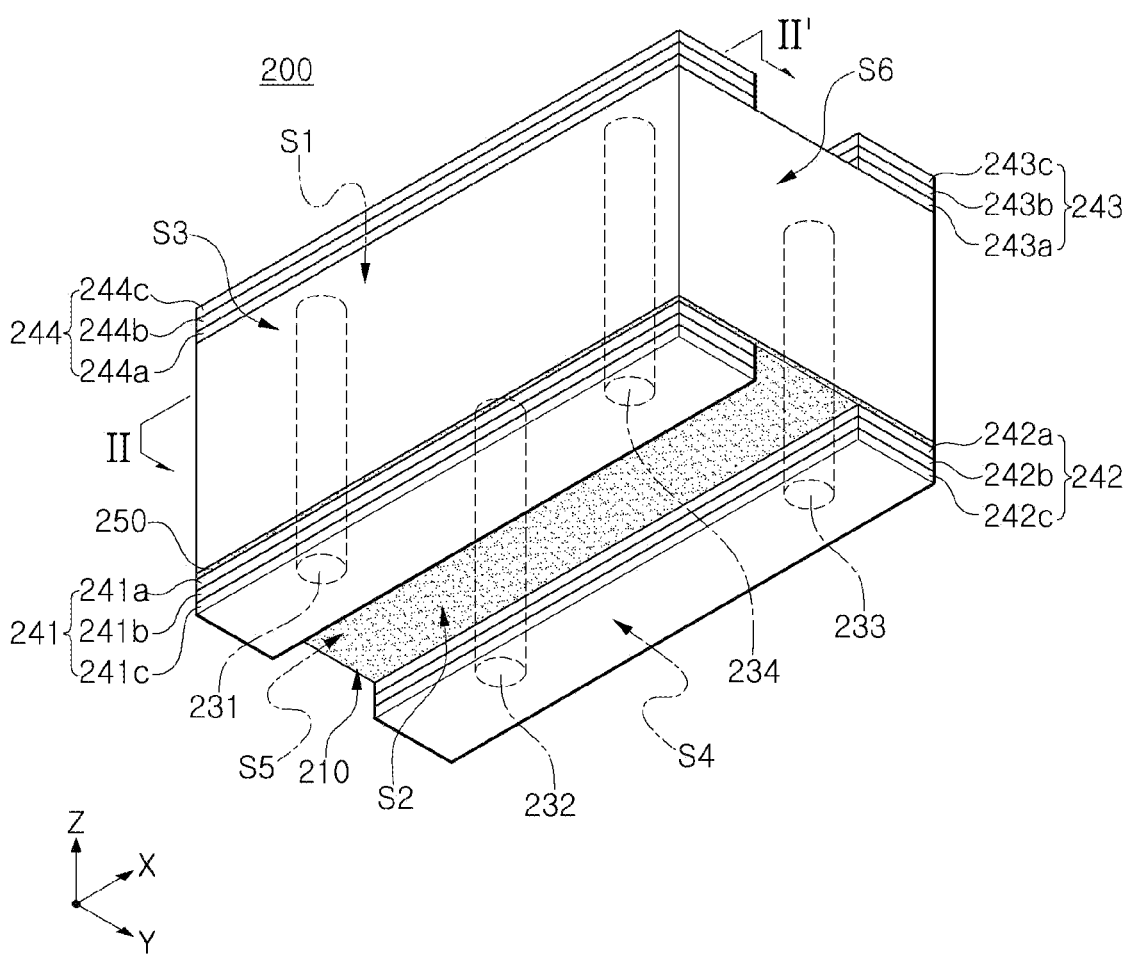
FIG. 1 is a perspective diagram illustrating a multilayer ceramic capacitor according to an example embodiment of the present disclosure.

Hereinafter, embodiments of the present disclosure will be described as follows with reference to the attached drawings. The shape and size of constituent elements in the drawings may be exaggerated or reduced for clarity.

These embodiments are described in sufficient detail to enable those skilled in the art to practice the invention. It is to be understood that the various embodiments of the invention, although different, are not necessarily mutually exclusive. For example, structures, shapes, and sizes described as examples in embodiments in the present disclosure may be implemented in another example embodiment without departing from the spirit and scope of the present disclosure. Shapes and sizes of elements in the drawings may be exaggerated for clarity of description, and the same elements will be indicated by the same reference numerals.

For clarity of description, some elements may be omitted or briefly illustrated, and thicknesses of elements may be magnified to clearly represent layers and regions. It will be understood that when a portion "includes" an element, it can further include another element, not excluding another element, unless otherwise indicated.

In the diagram, an X direction may be defined as a first direction, an L direction, or a length direction, a Y direction may be defined as a second direction, a W direction, or a width direction, and a Z direction may be defined as a third direction, a T direction, or a thickness direction. However, these directions are defined for convenience of explanation, and the claims are not particularly limited by the directions defined as described above.

The meaning of a "connection" of a component to another component in the description includes an indirect connection through an adhesive layer as well as a direct connection between two components. In addition, "electrically connected" means the concept including a physical connection and a physical disconnection. It can be understood that when an element is referred to with "first" and "second", the element is not limited thereby. The terms "first," "second," etc. may be used only for a purpose of distinguishing the element from the other elements, and may not limit the sequence or importance of the elements. In some cases, a first element may be referred to as a second element without departing from the scope of the claims set forth herein. Similarly, a second element may also be referred to as a first element.

The term "an exemplary embodiment" used herein does not refer to the same exemplary embodiment, and is provided to emphasize a particular feature or characteristic different from that of another exemplary embodiment. However, exemplary embodiments provided herein are considered to be able to be implemented by being combined in whole or in part one with another. For example, one element described in a particular exemplary embodiment, even if it is not described in another exemplary embodiment, may be understood as a description related to another exemplary embodiment, unless an opposite or contradictory description is provided therein.

Terms used herein are used only in order to describe an exemplary embodiment rather than limiting the present disclosure. In this case, singular forms include plural forms unless interpreted otherwise in context.

In the description below, a multilayer ceramic capacitor will be described in accordance with an example embodiment with reference to FIGS. 1 to 4.

A multilayer ceramic capacitor 200 in the example embodiment may include a body 210 including a dielectric layer 211 and first and second internal electrodes 221 and 222 disposed with the dielectric layer 211 interposed therebetween and disposed in point-symmetry with each other, first and second connection electrodes 231 and 234 penetrating the body 210 in a direction perpendicular to the dielectric layer 211 and connected to the first internal electrode 221, third and fourth connection electrodes 232 and 233 penetrating the body 210 in a direction perpendicular to the dielectric layer 211 and connected to the second internal electrode 222, first and second external electrodes 241 and 244 disposed on both surfaces of the body 210 and connected to the first and second connection electrodes 231 and 234, and third and fourth external electrodes 242 and 243 spaced apart from the first and second external electrodes 241 and 244 and connected to the third and fourth connection electrodes 232 and 233, and the first and second internal electrodes 221 and 222 includes regions 221a and 222a in which an electrode is not disposed.

In the body 210, the dielectric layer 211 and the first and second internal electrodes 221 and 222 may be alternately layered. A shape of the body 210 may not be limited to any particular shape, and may have a hexahedral shape or a shape similar to a hexahedron as illustrated in the diagram. Due to contraction of ceramic powder included in the body 210 during a sintering process, the body 210 may not have an exact hexahedral shape with straight lines, but may have a substantially hexahedral shape.

The body 210 may have a first surface S1 and a second surface S2 opposing each other in a thickness direction (Z direction), a third surface S3 and a fourth surface S4 connected to the first surface S1 and the second surface S2 and opposing each other in a width direction (Y direction), and a fifth surface S5 and a sixth surface S6 connected to the first surface S1 and the second surface S2 and the third surface S3 and the fourth surface S4 and opposing each other in a length direction (X direction). One of the first, second, third, and fourth surfaces S1, S2, S3, and S4 may be configured as a mounting surface.

The plurality of dielectric layers included in the body 210 may be in a sintered state, and the dielectric layers may be integrated such that identifying boundaries between adjacent dielectric layers is not possible without using a scanning electron microscope (SEM).

In the example embodiment, a material of the dielectric layer 211 may not be limited to any particular material as long as sufficient capacitance can be obtained. For example, the dielectric layer 211 may be formed using a barium titanate material, a Perovskite material compound with lead (Pb), a strontium titanate material, or the like. The barium titanate material may include a $BaTiO_3$ powder, and an example of the ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which calcium (Ca), zirconium (Zr), and the like, are partially solidified. As the material of the dielectric layer 211, a barium titanate (BaTiO3) powder, or the like, including various ceramic additives, organic solvents, coupling agents, dispersing agents, and the like, may be used depending on an intended purpose.

First and second cover portions 212 and 213 each having a certain thickness may be formed in a lower portion of a lowermost internal electrode and in an upper portion of an uppermost internal electrode of the body 210. The first and second cover portions 212 and 213 may have the same composition as a composition of the dielectric layer 211, and the first and second cover portions 212 and 213 may be formed by layering at least one or more of dielectric layers which does not include an internal layer in each of an upper portion of an uppermost internal electrode and a lower portion of a lowermost internal electrode of the body 210.

In the example embodiment, an identifier 250 may be disposed on the first cover portion 212 and/or the second cover portion 213 if desired. The identifier 250 may be formed in one of the first cover portion 212 and the second cover portion 213, and upper and lower portions of the body 210 may be distinguished from each other by the identifier 250 on the basis of a difference in brightness or color. The identifier 250 may be configured as a dielectric layer formed by sintering a single ceramic green sheet or layering a plurality of ceramic green sheets, and may be included in the first cover portion 212 and/or the second cover portion 213.

A method of providing a difference in brightness or color between the first cover portion 212 and the second cover portion 213 by using the identifier 250 is not limited to any particular method. For example, the identifier 250 may be formed using ceramic particles each having a size different from a size of ceramic particles included in the body, or may be formed by adding one or more metal oxides selected from among Ni, Mn, Cr, Mg, Y, and V, or $BaSiO_3$, $CaSiO_3$, or the like, to a ceramic composition, and the identifier 250 may be marked using a laser. However, a material of the identifier 250 and a method of forming the identifier 250 may not be limited to the above-described example. By disposing the identifier, an upper portion and a lower portion of the body may be distinguished from each other, and a direction of a protrusion in which the through electrodes protrude may be identified. Thus, the multilayer ceramic capacitor in the example may be mounted on a substrate in a direction in which improved cohesion force is obtained.

In the example embodiment, a thickness of the body 210 may be 100 μm or less. The thickness of the body 210 may refer to a vertical distance between the first surface and the second surface. A lower limit of the thickness is not limited to any particular size, and may be 5 μm or greater, for example. By manufacturing the body 210 to have a thickness of 100 μm or less, the multilayer ceramic capacitor in the example embodiment may be applied to a multilayer ceramic capacitor embedded in a substrate and/or a capacitor mounted on a lower end of an application processor (AP) in a form of a land-side capacitor (LSC).

The internal electrodes 221 and 222 may include the first and second internal electrodes 221 and 222 alternately disposed with the dielectric layer 211 interposed therebetween and opposing each other. The first and second internal electrodes 221 and 222 may include the regions 221*a* and 222*a* in which an electrode is not disposed, respectively. The regions 221*a* and 222*a* in which an electrode is not disposed may refer to regions in which the first and second internal electrodes 221 and 222 are not disposed, respectively, and may only connect the first and second internal electrodes 221 and 222 to external electrodes having different polarities. Accordingly, the first and second connection electrodes 231 and 234 may penetrate the region 221*a* in which an electrode is not formed and may be spaced apart from the second internal electrode 222, and the third and fourth connection electrodes 232 and 233 may penetrate the region 222*a* in which an electrode is not formed and may be spaced apart from the first internal electrode 221.

By connecting the first and second internal electrodes 221 and 222 to the first to fourth external electrodes 241, 242, 243, and 244 by the first to fourth connection electrodes 231, 232, 233, and 234, an area of overlap between the first and second internal electrodes 221 and 222 with the dielectric layer 211 interposed therebetween may increase, and accordingly, capacitance of the multilayer ceramic capacitor 200 may increase.

The first and second internal electrodes 221 and 222 may include a large amount of nickel (Ni), but a composition of the first and second internal electrodes 221 and 222 is not limited thereto. For example, the first and second internal electrodes 221 and 222 may be formed of a conductive paste including one or more materials from among silver (Ag), palladium (Pd), gold (Au), platinum (Pt), nickel (Ni), tin (Sn), copper (Cu), tungsten (W), titanium (Ti), and alloys thereof. As a method of printing the conductive paste, a screen printing method, a gravure printing method, or the like, may be used, but the printing method is not limited thereto.

The multilayer ceramic capacitor 200 in the example embodiment may include the first connection electrode 231, the second connection electrode 234, the third connection electrode 232, and the fourth connection electrode 233, the first and second connection electrodes 231 and 234 may be electrically connected to the first and second external electrodes 241 and 244, and the third and fourth connection electrodes 232 and 233 may be electrically connected to the third and fourth external electrodes 242 and 243.

By disposing a plurality of the connection electrodes connecting the first external electrode 241 and the second external electrode 244, and the third external electrode 242 and the fourth external electrode 243 as described above, cohesion force between the external electrode and the body may improve.

Figure 3A:
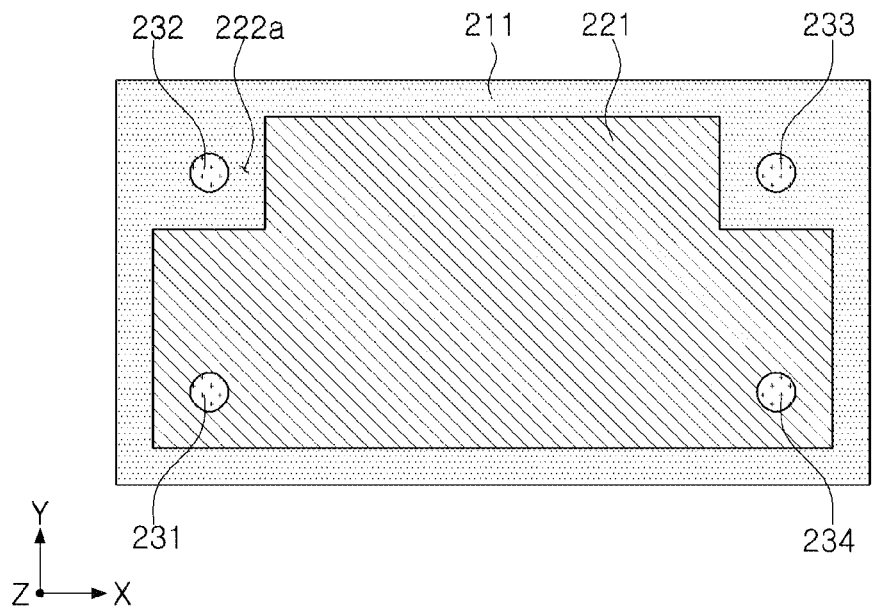
FIGS. 3A and 3B are cross-sectional diagrams taken in an X direction and a Y direction illustrated in FIG. 1.
Figure 3B:
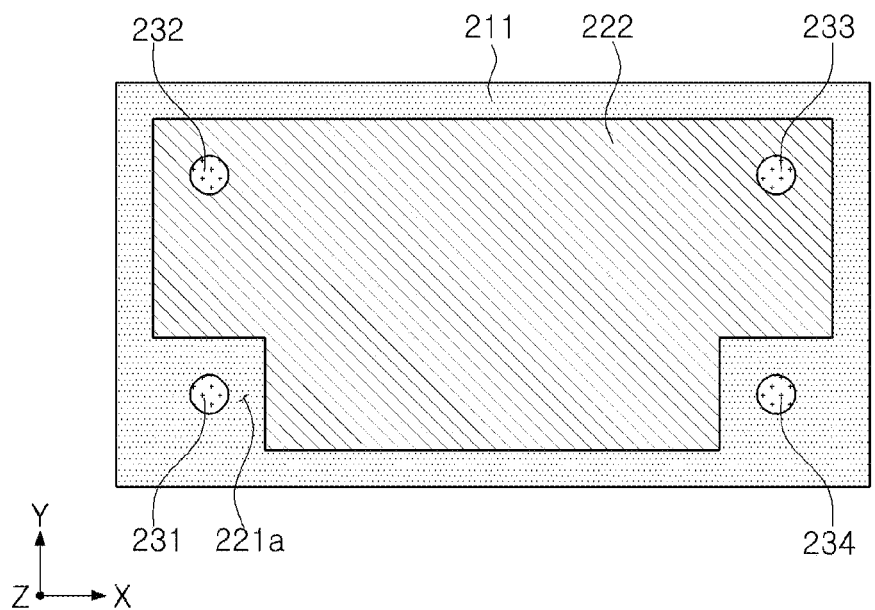

FIGS. 3A and 3B are cross-sectional diagrams illustrating shapes of a first internal electrode 221 and a second internal electrode 222. Referring to FIGS. 3A and 3B, the first internal electrode 221 and the second internal electrode 222 may have shapes forming point-symmetry with each other. The configuration in which the internal electrodes 221 and 222 form point-symmetry may indicate that the first internal electrode 221 and the second internal electrode 222 may be disposed in point-symmetry with each other with reference to a central point of each of the internal electrodes 221 and 222 when a virtual line is disposed under the assumption that an electrode is present in the regions of the internal electrodes 221 and 222 in which an electrode is not actually disposed. As the first and second internal electrodes 221 and 222 have shapes forming point-symmetry, mutual inductance may be offset, such that equivalent series inductance (ESL) of the multilayer ceramic capacitor may improve.

In the example embodiment, each of the first internal electrode 221 and the second internal electrode 222 may have a T-shaped form. Referring to FIGS. 3A and 3B, each of the first and second internal electrodes 221 and 222 may have a shape having a long side taken in a length direction, and a short side taken in a width direction, and the shapes illustrated in FIGS. 3A and 3B may represent T-shaped forms.

As each of the internal electrodes 221 and 222 has a T-shaped form, regions 221*a* and 222*a* in which an electrode is not disposed may be formed in the internal electrodes 221 and 222, and accordingly, the connection electrodes 231, 232, 233, and 234 may penetrate through the regions 221*a* and 222*a* in which an electrode is not disposed. By including the above-described structure, capacitance may increase as compared to the configuration in which a via hole is formed on an internal electrode.

In an example embodiment, each of the regions 221*a* and 222*a* in which an electrode is not disposed in the internal electrodes 221 and 222 may have a rectangular shape. Referring to FIGS. 3A and 3B, each of the regions 221*a* and 222*a* in which an electrode is not disposed may have a rectangular shape towards a central portion of the internal electrode.

Figure 4A:
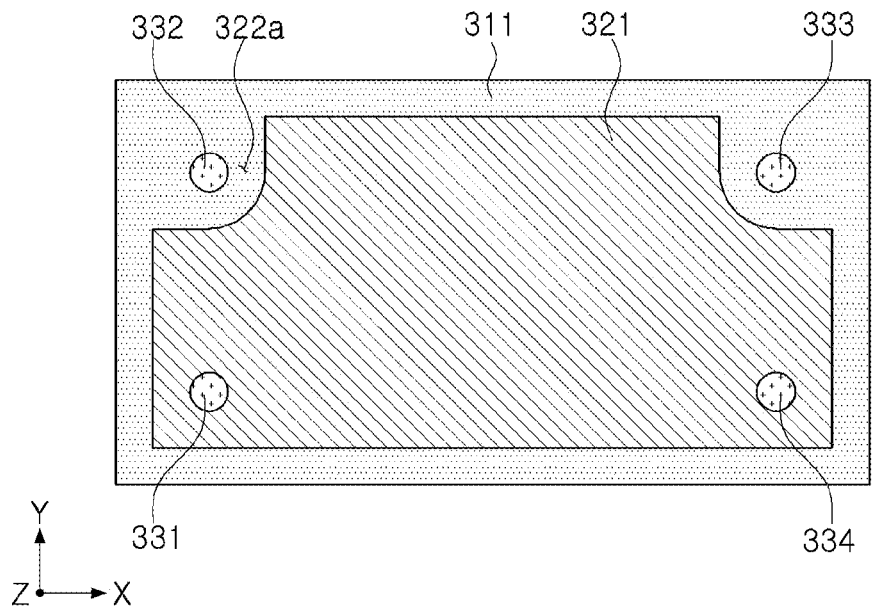
FIGS. 4A and 4B are cross-sectional diagrams taken in an X direction and a Y direction illustrated in FIG. 1.
Figure 4B:
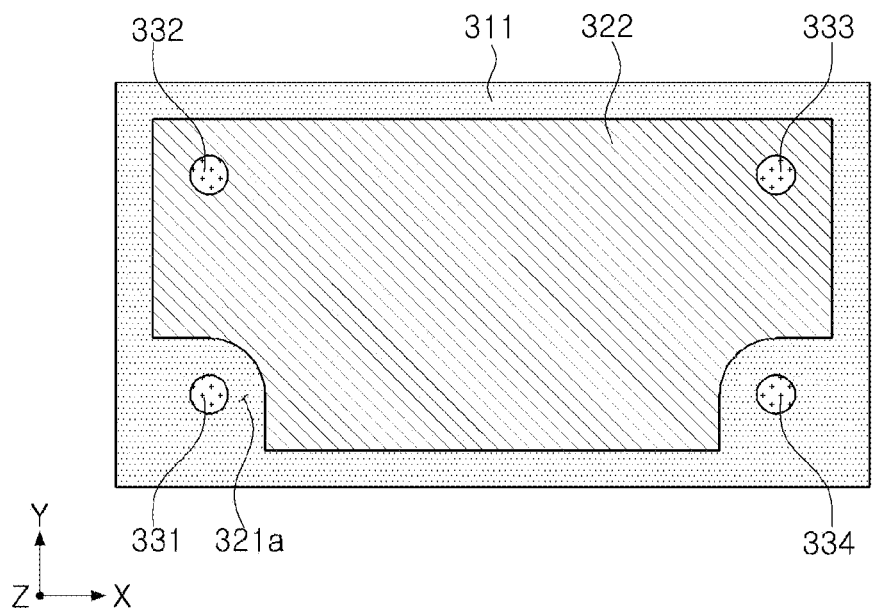

In another example embodiment, each of the regions 221*a* and 222*a* in which an electrode is not disposed in the internal electrodes 221 and 222 may have a round shape. Referring to FIGS. 4A and 4B, each of the regions 221*a* and 222*a* in which an electrode is not disposed may have a round shape towards a central portion of the internal electrode.

In the example embodiment described above, each of the regions in which an electrode is not disposed in the internal electrodes may have a rectangular shape and/or a round shape, but a shape of an internal electrode pattern is not limited thereto. An example of a shape of an internal electrode pattern may include a trapezoidal shape, a triangular shape, a polygonal shape, or a combination of any of these shapes.

In an example embodiment, the connection electrodes 231, 232, 233, and 234 may include a large amount of nickel, but a composition of the connection electrodes 231, 232, 233, and 234 is not limited thereto. For example, the connection electrodes 231, 232, 233, and 234 may be formed using a conductive paste including one or more materials from among silver (Ag), palladium (Pd), gold (Au), platinum (Pt), nickel (Ni), tin (Sn), copper (Cu), tungsten (W), titanium (Ti), and alloys thereof. A method of forming the connection electrodes 231, 232, 233, and 234 is not limited to any particular method. For example, the connection electrodes 231, 232, 233, and 234 may be formed by forming a laminate in which the dielectric layer 211, the first internal electrode 221, and the second internal electrode 222 are layered, drilling the body 210 in a third direction (Z direction) using a laser drill, a mechanical pin punch, or the like, and filling the drilled portion with the above-described conductive paste.

In an example embodiment, the internal electrodes 221 and 222 and the connection electrodes 231, 232, 233, and 234 may include the same metal composition. The same metal material may be nickel (Ni), but an example of the metal material is not limited thereto. For example, the metal material may include one or more elements from among silver (Ag), palladium (Pd), gold (Au), platinum (Pt), nickel (Ni), tin (Sn), copper (Cu), tungsten (W), titanium (Ti), and alloys thereof. When the internal electrodes 221 and 222 and the connection electrodes 231, 232, 233, and 234 of the multilayer ceramic capacitor include the same metal material, sintering initiation temperatures and/or sintering contraction rates of the internal electrodes 221 and 222 and the connection electrodes 231, 232, 233, and 234 may match such that cracks, delamination, and the like, may be prevented.

Figure 2:
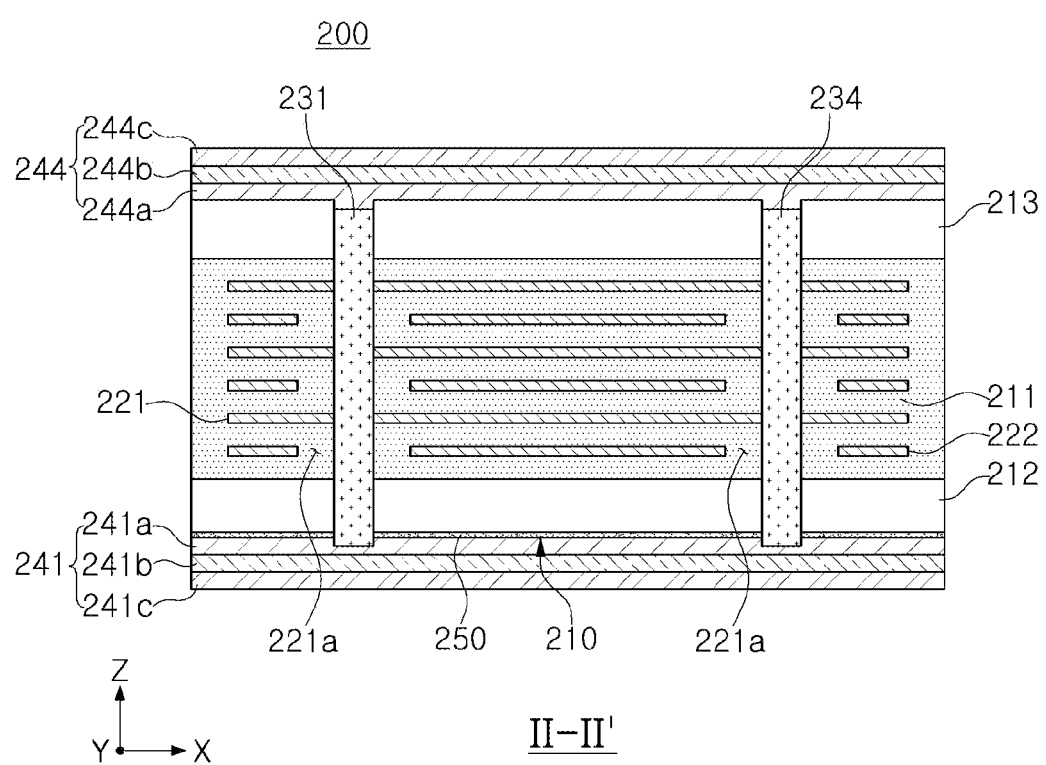
FIG. 2 is a cross-sectional diagram taken along line I-I' in FIG. 1.

In the example embodiment, the connection electrodes 231, 232, 233, and 234 may protrude in a Z direction. Referring to FIG. 2, the connection electrode 231 may protrude to the second surface of the body 210. That is because the connection electrode 231 may protrude externally of a through-hole of the body 210 due to sintering contraction, and the like, during a process for forming the connection electrode. Depending on a size of the protrusion, an air gap may be formed between the electrode and a substrate when the multilayer ceramic capacitor is mounted in or on the substrate, which may cause deterioration of cohesion force. In the multilayer ceramic capacitor in the example embodiment, as the external electrodes are disposed on both the first surface and the second surface of the body, the deterioration of cohesion force caused by the protrusion may be prevented.

In the example embodiment, a shape of each of the connection electrodes 231, 232, 233, and 234 may be configured as a round shape, but an example of the shape is not limited thereto. Each of the connection electrodes 231, 232, 233, and 234 may have a quadrangular shape, a triangular shape, or the like. Also, the connection electrodes 231, 232, 233, and 234 may occupy 5 to 65% of an area of the body in a width direction (Y direction), but an example embodiment thereof is not limited thereto.

In the example embodiment, the first to fourth external electrodes 241, 242, 243, and 244 may be disposed on both surfaces of the body 210. The first and second external electrodes 241 and 244 may be disposed on the first surface S1 and the second surface S2 of the body 210, respectively, and may be electrically connected to each other through the first connection electrode 231 and the second connection electrode 234. The third and fourth external electrodes 242 and 243 may be spaced apart from the first and second external electrodes 241 and 244, may be disposed on the first surface S1 and the second surface S2 of the body 110, respectively, and may be electrically connected through the third connection electrode 232 and the fourth connection electrode 233.

The multilayer ceramic capacitor 200 configured as above may have improved capacitance by increasing a region in which the first and second internal electrodes 221 and 222 are disposed by reducing margin portions on side surfaces connecting an upper surface and a lower surface of the body 210. Accordingly, in the multilayer ceramic capacitor 200 in the example embodiment, the external electrodes may not be disposed on side surfaces, and the internal electrodes may be connected to the external electrodes through the connection electrodes penetrating the body, thereby increasing capacitance.

In the description below, a configuration of the external electrodes will be described on the basis of the first external electrode 241 with reference to FIG. 2. The description of the first external electrode 241 may be applied to the second to fourth external electrodes 242, 243, and 244.

Referring to FIG. 2, the first external electrode 241 may include a first sintered electrode 241a, and first and second plating layers 241b and 241c. The first sintered electrode 241a may include one or more materials from among silver (Ag), palladium (Pd), gold (Au), platinum (Pt), nickel (Ni), tin (Sn), copper (Cu), tungsten (W), titanium (Ti), and alloys thereof, and may be configured as a sintered electrode formed by sintering a conductive paste including nickel (Ni), for example. When the external electrode is formed as a sintered electrode, the first sintered electrode 241, the external electrodes may be simultaneously sintered with the body and the internal electrodes, and cohesion strength between the body and the external electrodes may improve.

In an example embodiment, an arithmetical average roughness (Ra) of a surface of each of the first to fourth external electrodes 241, 242, 243, and 244 may be within a range of 1 nm to 100 nm. In the example embodiment, the term "arithmetical average roughness (Ra)" may refer to an average roughness value of a distance to an virtual central line, and the notion that the external electrode has an arithmetical average roughness (Ra) of 1 nm to 100 nm may indicate that the external electrode may have the above-mentioned range of surface roughness, and that the external electrode may have the artificially configured surface roughness satisfying the above-mentioned range.

The arithmetical average roughness (Ra) may be calculated by disposing a virtual central line with respect to roughness formed on surfaces of the first to fourth external electrodes 241, 242, 243, and 244, measuring each distance (e.g., r1, r2, r3 . . . rn) with reference of the virtual central line having the roughness, and calculating an average value of the distances using Equation 1 (below), and a value obtained from the calculation may be determined as the arithmetical average roughness (Ra) of the dielectric layer.

$$Ra = \Sigma_g^n r_g/n \qquad \text{[Equation 1]}$$

The external electrodes having the arithmetical average roughness (Ra) satisfying the above-mentioned range may be formed through physical or chemical surface modification. A method of the surface modification is not limited to any particular method as long as the above-mentioned roughness may be obtained. For example, a surface process using an acid or an alkaline solution, a physical grinding process using a grinding material, or the like, may be used.

Generally, as an oxide layer may be formed on a surface of a sintered electrode including nickel during a sintering process, it may be difficult to form a plating layer, a plating layer may be easily separated, or there may be other issues. When a surface of the external electrode in the example embodiment is reformed to have an arithmetical average roughness (Ra) satisfying the above-mentioned range, an oxide layer may be removed, or a surface having a certain roughness may be formed. Accordingly, adhesion force between the external electrode and a plating layer may improve, and the separation of a plating layer may be prevented.

The first plating layer 241b may include nickel, and the second plating layer 241b may include copper or tin. As the first plating layer 241b includes nickel, adhesion force with the first sintered electrode 241a may improve. Also, as the second plating layer 241b includes copper or tin, the external electrode having improved conductivity, improved plating adhesion properties, and improved soldering properties may be provided.

In another example embodiment, the first plating layer 241b may include tin, and the second plating layer 241b may include nickel. As the first plating layer 241b includes tin, adhesion force with the first sintered electrode 241a may improve. Also, as the second plating layer 241b includes nickel, a uniform plating layer may be formed.

In an example embodiment, a thickness of each of the first to fourth external electrodes 241, 242, 243, and 244 may be within a range of 3 μm to 30 μm. A thickness of each of the first to fourth external electrodes 241, 242, 243, and 244 may refer to an overall thickness of the external electrode including the sintered electrodes, the first plating layer, and the second plating layer layered therein, and may refer to a distance perpendicular to a surface of the external electrode from the body. By configuring a thickness of the external electrodes as above, when the multilayer ceramic capacitor is mounted on or embedded in a substrate, the multilayer ceramic capacitor may not occupy a large area and may have improved mounting properties.

The multilayer ceramic capacitor in the example embodiment may be manufactured by a method described below. Green sheets formed of dielectric layers, on one surface of which a paste including a conductive metal is printed in a certain thickness, may be layered, thereby preparing a body including dielectric layers and first and second internal electrodes disposed with the dielectric layer interposed therebetween.

A first cover portion 212 and a second cover portion 213 may be formed by layering the dielectric layers which do not include the internal electrodes on upper and lower portions of the body 210. If desired, an identifier 250 may be provided.

After forming the cover portions, a via H may be formed in the body using a laser drill, a mechanical pin punch, or the like. The via H may be coated with a conductive paste, or may be filled with a conductive material through a plating process, or the like, thereby forming first to fourth connection electrodes 231, 232, 233, and 234.

First and second external electrodes 241 and 244 connected to the first and second connection electrodes 231 and 234, and third and fourth external electrodes 242 and 243 connected to the third and fourth connection electrodes 232 and 233 may be formed on one surface of the body 210.

For example, the forming the first to fourth external electrodes may include forming first to fourth sintered electrodes including nickel on the body, forming a first plating layer on each of the first to fourth sintered electrodes, and forming a second plating layer on the first plating layer.

The sintered electrodes may be formed by coating a surface with a conductive paste including nickel and sintering the paste, the first plating layer may include nickel and may be formed by an electrical or chemical plating method, and the second plating layer may include copper or tin and may be formed by an electrical or chemical plating method.

After forming the sintered electrode layers, a bake-out process and a sintering process may be performed, the first plating layer and the second plating layer may be formed, thereby manufacturing the multilayer ceramic capacitor illustrated in FIG. 1.

According to the aforementioned example embodiments, capacitance of the multilayer ceramic capacitor may improve.

Also, insulating breakdown voltage (BDV) of the multilayer ceramic capacitor may improve.

Further, the multilayer ceramic capacitor having improved equivalent series inductance (ESL) by offsetting of mutual inductance may be provided.

While the example embodiments have been shown and described above, it will be apparent to those skilled in the art that modifications and variations could be made without departing from the scope of the present invention as defined by the appended claims.

What is claimed is:

1. A multilayer ceramic capacitor, comprising:
a body including a dielectric layer and first and second internal electrodes disposed with the dielectric layer interposed therebetween in a stacking direction and disposed in point-symmetry with each other;
first and second connection electrodes penetrating the body in the stacking direction and connected to the first internal electrode;
third and fourth connection electrodes penetrating the body in the stacking direction and connected to the second internal electrode;
first and second external electrodes disposed on both surfaces of the body opposing each other in the stacking direction and connected to the first and second connection electrodes; and
third and fourth external electrodes spaced apart from the first and second external electrodes and connected to the third and fourth connection electrodes,
wherein at least one of the first, second, third or fourth external electrodes has a length in a direction perpendicular to the stacking direction which is greater than a maximum length of at least one of the first or second internal electrodes in the direction perpendicular to the stacking direction, and
wherein at least one of the first or second internal electrode is entirely spaced apart from all surfaces of the body.

2. The multilayer ceramic capacitor of claim 1, wherein each of the first and second internal electrodes has a T-shaped form.

3. The multilayer ceramic capacitor of claim 1, wherein the first and second internal electrodes include nickel.

4. The multilayer ceramic capacitor of claim 1, wherein the first to fourth external electrodes include sintered electrodes comprising nickel.

5. The multilayer ceramic capacitor of claim 1, wherein each of the first to fourth external electrodes has an arithmetical average roughness (Ra) of 1 nm to 100 nm.

6. The multilayer ceramic capacitor of claim 1, wherein the first to fourth external electrodes include a first plating layer and a second plating layer layered in order on a sintered electrode.

7. The multilayer ceramic capacitor of claim 1, wherein a thickness each of the first to fourth external electrodes is within a range of 1 μm to 10 μm.

8. The multilayer ceramic capacitor of claim 1, wherein a thickness of the body is 100 μm or less.

9. The multilayer ceramic capacitor of claim 1, wherein the first and second internal electrodes include a cut-out region.

10. The multilayer ceramic capacitor of claim 1, wherein the first and second internal electrodes include a region in which an electrode is not disposed.

11. The multilayer ceramic capacitor of claim 10, wherein the region in which an electrode is not disposed in each of the first and second internal electrodes has a rectangular shape.

12. The multilayer ceramic capacitor of claim 10, wherein the region in which an electrode is not disposed in each of the first and second internal electrodes has a round shape.

13. The multilayer ceramic capacitor of claim 10,
wherein the first and second connection electrodes penetrate the region in which an electrode is not disposed in the second internal electrode, and
wherein the third and fourth connection electrodes penetrate the region in which an electrode is not disposed in the first internal electrode.

14. A multilayer ceramic capacitor, comprising:
a body including a dielectric layer and first and second internal electrodes disposed with the dielectric layer interposed therebetween in a stacking direction and disposed in point-symmetry with each other;
first and second connection electrodes penetrating the body in the stacking direction and connected to the first internal electrode;
third and fourth connection electrodes penetrating the body in the stacking direction and connected to the second internal electrode;
first and second external electrodes disposed on both surfaces of the body opposing each other in the stacking direction and connected to the first and second connection electrodes; and
third and fourth external electrodes spaced apart from the first and second external electrodes in a width direction and connected to the third and fourth connection electrodes,
wherein at least one of the first, second, third or fourth external electrodes has a length in a direction perpendicular to the stacking and width directions which is greater than a maximum length of at least one of the first or second internal electrodes in the direction perpendicular to the stacking and width directions, and
wherein at least one of the first or second internal electrodes is entirely spaced apart from a surface of the body.

* * * * *